T. A. HEDENDAHL.
DUPLEX PRESSURE EMERGENCY BRAKE.
APPLICATION FILED NOV. 20, 1906.
928,970.
Patented July 27, 1909.
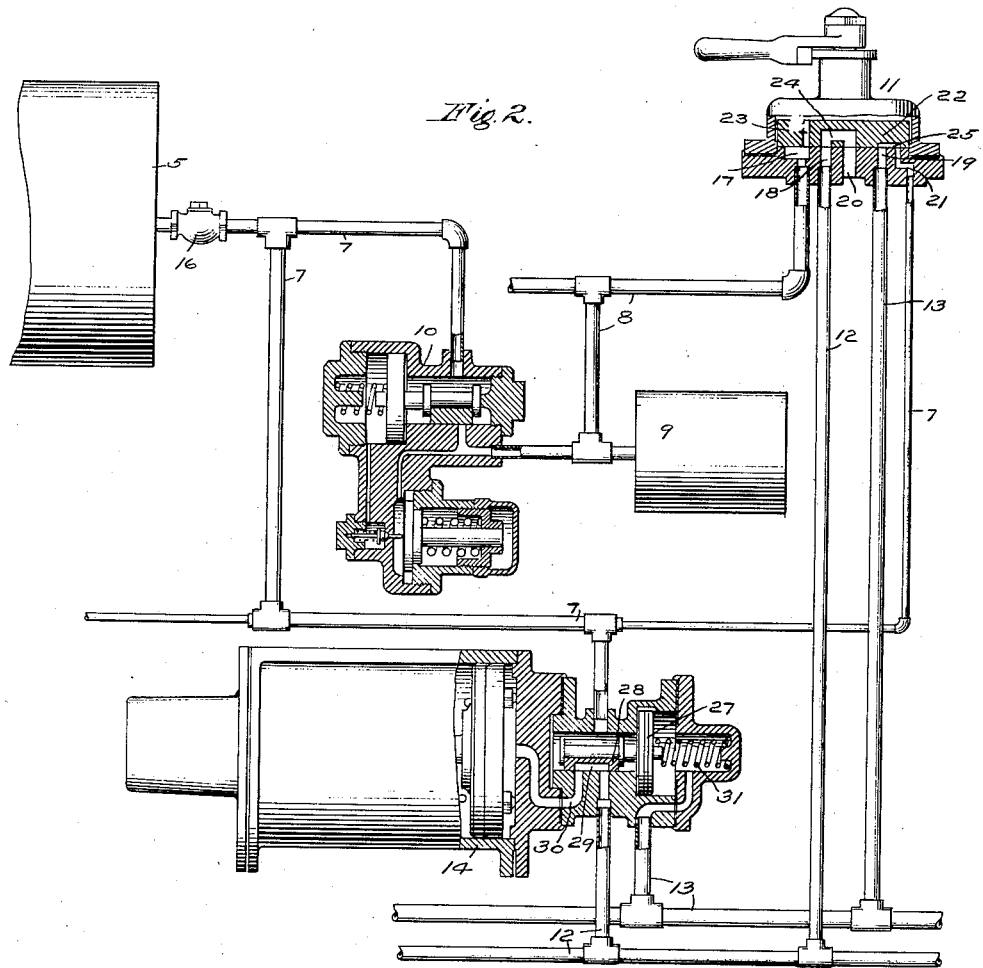
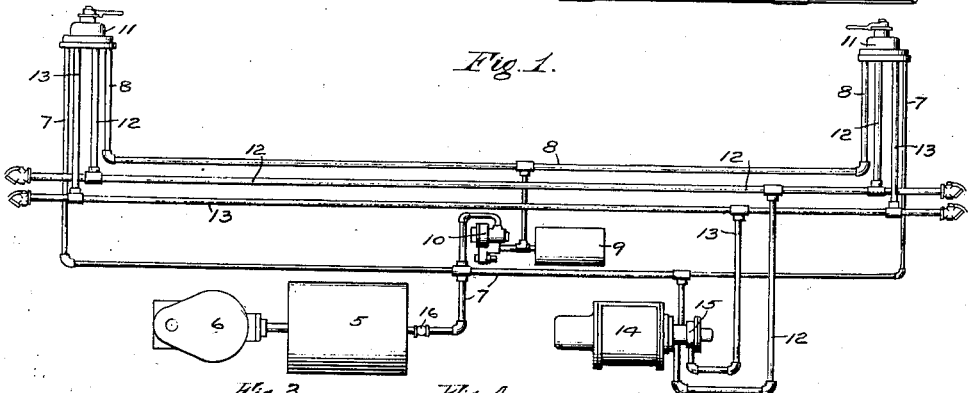
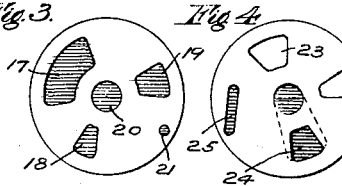
WITNESSES
INVENTOR
T. A. Hedendahl
by E. H. Wright
Att'y.

UNITED STATES PATENT OFFICE.

THEODORE A. HEDENDAHL, OF DENVER, COLORADO, ASSIGNOR TO THE WESTINGHOUSE AIR BRAKE COMPANY, OF PITTSBURG, PENNSYLVANIA, A CORPORATION OF PENNSYLVANIA.

DUPLEX-PRESSURE EMERGENCY-BRAKE.

No. 928,970.      Specification of Letters Patent.      Patented July 27, 1909.

Application filed November 20, 1906. Serial No. 344,210.

*To all whom it may concern:*

Be it known that I, THEODORE A. HEDENDAHL, a citizen of the United States, residing at Denver, in the county of Denver and State of Colorado, have invented new and useful Improvements in Duplex - Pressure Emergency-Brakes, of which the following is a specification.

This invention relates to combined straight air service and automatic emergency brake apparatus, wherein the maximum degree of pressure admitted to the brake cylinder in direct service applications is limited to a predetermined amount, while in emergency applications the automatic valve device operates to supply air at a greater maximum pressure to the brake cylinder.

This form of equipment is especially adapted to be employed in traction service, such as electric cars, where the cars are sometimes operated singly, and at other times in trains of two or three cars, either motor cars or a motor car and trailer, and the principal object of my present invention is to provide improved means for limiting the maximum degree of pressure which may be supplied by the motorman's brake valve to the straight air pipe in service applications. And another object is to provide an additional connection for reservoir pressure in order to release the brakes after an automatic emergency application.

In the accompanying drawing; Figure 1 is a diagrammatic elevation of a car brake equipment embodying one form of my improvement; Fig. 2 a similar diagrammatic view of a portion of said apparatus on a larger scale, the valve mechanism being shown in vertical section; Fig. 3 a plan view of the seat of the motorman's brake valve; and Fig. 4 a face view of the rotary valve.

As shown in the drawing, the apparatus comprises a main reservoir 5, which may be charged with compressed air from any suitable source, such as a motor driven pump 6, a motorman's brake valve 11, preferably one at each end of the car, for controlling the supply of air to the train pipe 13 leading to the automatic emergency valve 15, and the straight air pipe 12 leading directly to the brake cylinder 14 through the emergency valve. This emergency valve is also connected with the main reservoir through pipe 7. A check valve 16 may be provided in the pipe 7 near the main reservoir, and the train pipe and straight air pipe are preferably extended to the ends of the car where they have the usual cocks and couplings for connection with similar pipes on adjacent cars when the same are coupled up in a train.

According to my improvement means, such as a reducing valve 10, are inserted between the reservoir supply or pipe 7, and a connection or pipe 8 leading to the brake valve 11 for limiting the maximum degree of pressure which may be admitted to the straight air pipe to a predetermined amount, which is less than the normal degree carried in the main reservoir. This reducing valve may be of any desired construction, that shown in Fig. 2 being of the standard slide valve type, which is well known in the art.

In order to provide sufficient volume of air at the desired reduced maximum degree of pressure I prefer to employ a service reservoir 9, communicating with pipe 8 and in effect constituting an enlargement thereof.

The emergency valve device as heretofore used, comprises a casing communicating with the main reservoir or pipe 7 and containing piston 27 and slide valve 28 having a cavity 29, which normally affords communication from straight air pipe 12 to the port 30 and the brake cylinder 14. A spring 31 normally holds the piston and valve in this position, but when a sudden reduction is made in train pipe pressure in emergency applications, the higher reservoir pressure acting on the piston moves the valve to cut off communication from the straight air pipe to the brake cylinder and to open communication from the main reservoir through port 30 into the brake cylinder, thereby applying the brakes with the maximum degree of pressure.

As shown in Figs. 2, 3 and 4, the motorman's brake valve has a seat containing ports 17, 18, 19, and 21 communicating respectively with the pipes 8, 12, 13 and 7, while the rotary valve 22 is provided with through ports 23 and 26 and cavities 24 and 25.

When in its normal or release position, as shown in Fig. 2, air at the reduced pressure, as determined by the adjustment of the feed or reducing valve 10, flows into service reservoir 9 and through pipe 8 through ports 17 and 23 into the chamber above the rotary valve 22. At the same time the brake cylinder is discharged to the atmosphere through straight air pipe 12, port 18, cavity 24, and exhaust port 20, while the train pipe is charged with air under pressure from the main reservoir through an additional branch of the pipe 7, port 21, cavity 25, and port 19, communicating with pipe 13.

In making an ordinary service application of the brakes, the brake valve is turned to a position for closing the exhaust and registering ports 26 and 18, the port 17 still being connected to port 23, air flows through the straight air pipe 12 to the brake cylinder. The service reservoir 9 affords a sufficient volume to draw from and the reducing valve device limits the maximum brake cylinder pressure obtainable in service applications to the desired predetermined amount less than the maximum main reservoir pressure.

When a sudden reduction is made in train pipe pressure for an emergency application, either automatically by a break-in-two, or by opening a conductor's valve, or by turning the brake valve to a position in which the cavity 24 connects the train pipe port 19 with the exhaust port 20, the piston 27 operates the valve 28 to cut off communication from the straight air pipe and opens communication from the main reservoir to the brake cylinder through port 30, whereby the air at the higher main reservoir pressure equalizes into the brake cylinder and applies the brakes with greater force than is obtainable in service applications.

In order to release the brakes after an emergency application, the brake valve is returned to normal position, whereupon air under pressure from the main reservoir equalizes through ports 21, 25, 19 and train pipe 13 on the piston 27 of the emergency valve device, and the spring 31 then returns the slide valve 28 to its normal position connecting port 30 to the straight air pipe 12 and allowing the air from the brake cylinder to exhaust through ports 18, 24 and 20 in the brake valve.

It will now be seen that my improvement has the advantage of providing a duplex pressure control of the brakes, in which the maximum pressure in service applications is limited to a predetermined desired degree, while a much higher degree of braking pressure is applied in emergency applications.

Having now described my invention, what I claim as new and desire to secure by Letters Patent, is:—

1. In a fluid pressure brake, the combination with a train pipe, a reservoir, a brake cylinder, a straight air pipe, and a motorman's brake valve for controlling the supply of air from the reservoir to the straight air pipe, of a reducing valve between the reservoir supply and the brake valve for limiting the degree of brake cylinder pressure in service applications, and an automatic valve device normally establishing communication from the straight air pipe to the brake cylinder, but operating under a reduction in train pipe pressure to cut off said communication and to open communication from the reservoir to the brake cylinder.

2. In a fluid pressure brake, the combination with a main reservoir, train pipe, service reservoir, straight air pipe, brake cylinder, and a brake valve for controlling the supply of air from the service reservoir to the straight air pipe, of a reducing valve between the main reservoir and service reservoir, and an automatic valve device normally establishing communication from the straight air pipe to the brake cylinder, but operating under a sudden reduction in train pipe pressure to close said communication and to open communication from the main reservoir to the brake cylinder.

3. In a fluid pressure brake, the combination with a reservoir, train pipe, brake cylinder, straight air pipe, and a brake valve for controlling the supply of air from the reservoir to the straight air pipe, of a reducing valve between the reservoir supply and the brake valve, an additional connection from the reservoir to the brake valve, and an automatic valve device adapted to operate under a sudden reduction in train pipe pressure to open direct communication from the reservoir to the brake cylinder.

4. In a fluid pressure brake, the combination with a reservoir, train pipe, straight air pipe, brake cylinder, and a reducing valve, of a brake valve having means for controlling the supply of air from the reducing valve to the straight air pipe, and from the reservoir to the train pipe, and an automatic valve device operating under a sudden reduction in train pipe pressure to open communication from the reservoir to the brake cylinder.

5. In a fluid pressure brake, the combination with a main reservoir, train pipe, service reservoir, straight air pipe, brake cylinder, and a reducing valve between main reservoir and service reservoir, of a brake valve having connection with the main reservoir, service reservoir, train pipe, and straight air pipe, and an automatic valve device operating under a sudden reduction in train pipe pressure to open communication from the main reservoir to the brake cylinder.

6. In a fluid pressure brake, the combination with a source of fluid pressure, train pipe, brake cylinder and a brake valve for supplying air to the brake cylinder, of a reducing valve between the source of pressure and the brake valve, and a valve device operated by variations in train pipe pressure for supplying air directly from the source of pressure to the brake cylinder.

7. In a fluid pressure brake, the combination with a train pipe, brake cylinder, reservoir, and reducing valve for limiting the pressure of fluid supplied from the reservoir, of an automatic valve device operated by a reduction in train pipe pressure for supplying air to the brake cylinder and a brake valve for supplying air from said reducing valve directly to the brake cylinder.

In testimony whereof I have hereunto set my hand.

THEODORE A. HEDENDAHL.

Witnesses:
ARTHUR JOHNSON,
W. S. BARTHOLOMEW.